United States Patent
Apfelbaum et al.

(10) Patent No.: US 10,645,051 B2
(45) Date of Patent: *May 5, 2020

(54) MEMORY-MAPPED INPUT/OUTPUT (I/O) CHANNEL

(71) Applicant: Red Hat Isreal, Ltd., Ra'anana (IL)

(72) Inventors: Marcel Apfelbaum, Afula (IL); Gal Hammer, Kfar Saba (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,884

(22) Filed: Apr. 20, 2018

(65) Prior Publication Data

US 2018/0241712 A1    Aug. 23, 2018

Related U.S. Application Data

(63) Continuation of application No. 14/936,283, filed on Nov. 9, 2015, now Pat. No. 9,961,033.

(51) Int. Cl.
*H04L 12/58* (2006.01)
*H04L 12/911* (2013.01)

(52) U.S. Cl.
CPC .............. *H04L 51/22* (2013.01); *H04L 47/70* (2013.01)

(58) Field of Classification Search
CPC ................................ H04L 51/22; H04L 47/70
USPC ......................................................... 709/206
See application file for complete search history.

(56) References Cited

U.S. PATENT DOCUMENTS

| | | | |
|---|---|---|---|
| 7,555,002 B2 | 6/2009 | Arndt et al. | |
| 7,802,071 B2* | 9/2010 | Oved | G06F 13/28 |
| | | | 711/170 |
| 8,009,589 B2 | 8/2011 | Burrow et al. | |
| 8,108,538 B2* | 1/2012 | Oved | G06F 9/542 |
| | | | 709/200 |
| 8,762,125 B2 | 6/2014 | Errickson et al. | |
| 8,776,050 B2* | 7/2014 | Plouffe | G06F 9/45537 |
| | | | 718/1 |

(Continued)

OTHER PUBLICATIONS

Wu et al., "Design of an InfiniBand Emulator over Myrinet: Challenges, Implementation, and Performance Evaluation", Network-Based Computing Laboratory Dept. of Computer and Information Science The Ohio State University Columbus, OH 43210; System Design and Performance IBM T.J. Watson Research Center Yorktown Heights, NY 10598, excerpt from http://web.cse.ohio-state.edu/pub/communication/techreports/tr03-01-ib-emulator.pdf (22 pages).

(Continued)

*Primary Examiner* — Kristie D Shingles
(74) *Attorney, Agent, or Firm* — K&L Gates LLP

(57) ABSTRACT

Various examples are directed to systems and methods for utilizing a memory-mapped I/O channel. A first application may request that a message be sent to a channel counterparty. A message driver may receive from the first application the request to send the message, where the request comprises payload data from the message. The message driver may write a work request to a send queue of a first queue pair at the first memory location. An emulated channel adapter may poll a physical address at a memory device corresponding to the first memory location; determine that the work request is present at the send queue, and send the payload data to the channel counterparty.

20 Claims, 5 Drawing Sheets

(56) References Cited

U.S. PATENT DOCUMENTS

| | | | |
|---|---|---|---|
| 8,959,215 | B2 | 2/2015 | Koponen et al. |
| 9,083,550 | B2 | 6/2015 | Cohen et al. |
| 2014/0241355 | A1 | 8/2014 | Tsirkin |

OTHER PUBLICATIONS

"Virtualization Techniques Network Virtualization InfiniBand Virtualization", excerpt from www.cs.nthu.edu.tw/~ychung/slides/Virtualization/Lecture%20InfiniBand%20Virtualization.pptx (76 pages).

"Delivering Application Performance with Oracle's InfiniBand Technology", May 2012, excerpt from www.oracle.com/technetwork/server-storage/networking/documentation/o12-020-1653901.pdf (42 pages).

Hillenbrand, "Towards Virtual IntiniBand Clusters with Network and Performance Isolation", Dec. 17, 2010-Jun. 16, 2011, Karlsruher Institute for Technology, excerpt from os.itec.kit.edu/downloads/da_2011_ hillenbrand-marius_virtual-infiniband-clusters.pdf (101 pages).

Liu et al., "High Performance VMM-Bypass I/O in Virtual Machines", Apr. 18, 2006, IBM T. J. Waston Research Center; The Ohio State University, excerpt from www.usenix.org/legacy/event/usenix06/tech/full_papers/liu/liu_html/usenix06.html (32 pages).

Liss, "Infiniband and RoCEE Virtualization with SR-IOV", Mar. 15, 2010, Mellanox Technologies, excerpt from www.slideshare.net/Cameroon45/infiniband-and-rocee-virtualization-with-sriov (23 pages).

Scholz, "A Look at Intel's Dataplane Development Kit", Newwork Architectures and Services, Aug. 2014 (8 pages).

Pfister, "An Introduction to the InfiniBandTM Architecture", IBM Enterprise Server Group, Chapter 42 (16 pages).

Grun, Infinibandtm, "Introduction to InfiniBandTM for End Users", IndiniBand Trade Association, 2010 (54 pages).

\* cited by examiner

MEMORY-MAPPED INPUT/OUTPUT (I/O) CHANNEL

CROSS REFERENCES TO RELATED APPLICATIONS

The present application is a continuation of U.S. application Ser. No. 14/936,283, filed on Nov. 9, 2015, the entire content of which is hereby incorporated by reference herein.

BACKGROUND

Communication between computing devices and applications executing at computing devices is a recurring technological challenge. Traditionally, computing device communication has utilized a bus I/O structure. Applications send communication requests to an operating system. The operating system then communicates with hardware via an Input/Output (I/O) bus, such as a Peripheral Component Interconnected (PCI) bus, to implement the communication request.

SUMMARY

Various examples are directed to systems and methods for utilizing a memory-mapped I/O channel. A first application may request that a message be sent to a channel counterparty. A message driver may receive from the first application the request to send the message, where the request comprises payload data from the message. The message driver may write a work request to a send queue of a first queue pair at the first memory location. An emulated channel adapter may poll a physical address at a memory device corresponding to the first memory location; determine that the work request is present at the send queue, and send the payload data to the channel counterparty.

In various examples, a first application of a virtual machine executing at a host computing device may send to an Infiniband (IB) driver, a request for a first queue pair. The request may include in indication of a channel counterparty. The first queue pair may comprise a send queue for sending messages to the channel counterparty and a receive queue for receiving messages from the channel counterparty. The IB driver may receive the request for the first queue pair and request a first memory location from a guest operating system (OS) of the first virtual machine. The IB driver may receive a first virtual machine physical address of the first memory location and send the first virtual machine physical address to an emulated channel adapter. The emulated channel adapter may determine a host computing device physical memory address for the first memory location and may periodically poll the first memory location for at least one work request written to the first queue pair.

FIGURES

Various examples are described herein in conjunction with the following figures, wherein.

DESCRIPTION

Figure 1:
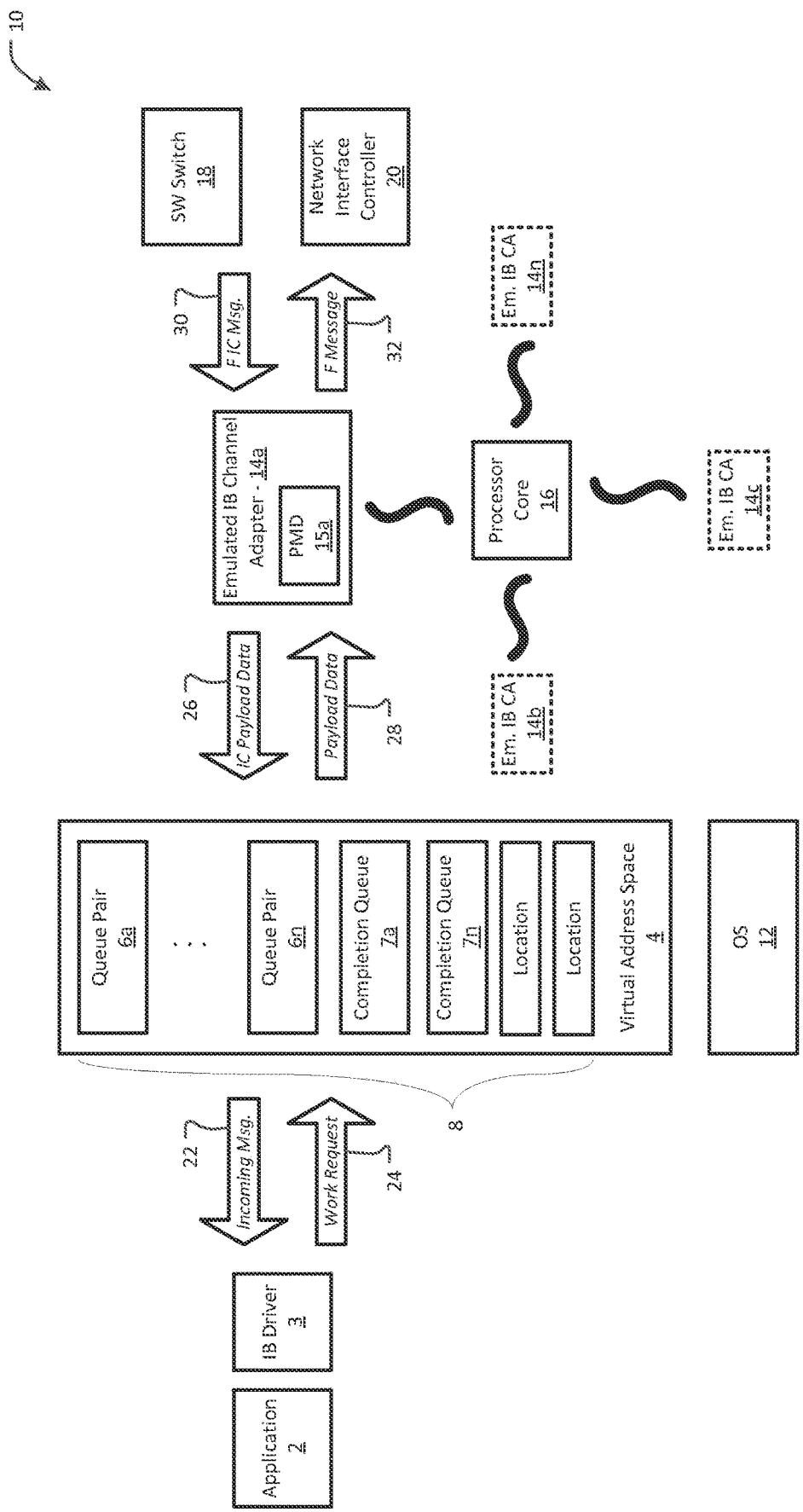
FIG. 1 is a diagram showing one example of a host computing device for implementing memory-mapped I/O channels.

Various examples are directed to systems and methods for implementing memory-mapped input/output (I/O) channels. In some examples, a host computing device may execute an emulated Infiniband™ (also referred to here as "IB") channel adapter (referred to herein as an emulated channel adapter) to implement a communication channel between an application and a channel endpoint. In some examples, the emulated channel adapter is implemented utilizing the Data Plane Development Kit (DPDK) released by the Intel Corporation. The application and the emulated channel adapter may be executed by a host computing device. The channel endpoint may be any hardware and/or software component positioned at the host computing device or at another computing device. In some examples, the emulated channel adapter communicates with an IB driver associated with the application or an operating system in communication with the application. The emulated channel adapter may behave as an IB channel adapter. For example, the application, through the driver, may send and receive messages formatted according to relevant IB syntax. The emulated channel adapter may process the sent and/or received messages in any suitable format. In this way, some examples described herein allow the application to take advantage of benefits of the IB fabric without utilizing IB hardware.

Infiniband™ architecture, developed by the Infiniband Trade Association (IBTA) defines a System Area Network (SAN) for interconnecting computing device nodes through an IB fabric made of cascaded switches. Each node or switch may attach to a single switch or multiple switches or directly to another node or switch. A node connects to the fabric via a host channel adapter. Two or more IB subnets may be interconnected by one or more IB routers. Endpoints (e.g., computing device nodes) in the IB architecture may be identified by a queue pair number (QPN) and a port identifier. A node may send a message to a recipient node by posting a work request to a send queue of the queue pair associated with the recipient node. Because of its speed and other advantages, many applications and operating systems already include support for the Infiniband™ architecture. A significant disadvantage of the Infiniband™ architecture, however, is that it requires dedicated IB hardware, which is often more expensive than similar non-IB hardware. For example, IB channel adapters, switches, and routers are hardware components designed to operate using according to IB standards. This can add significant expense to computer systems that utilize IB.

According to various examples, the emulated channel adapter may replace a dedicated IB channel adapter device. For example, the emulated channel adapter may service queue pairs held by one or more applications to implement memory-mapped communications between computing device nodes. Computing device nodes may be any suitable computing device software (e.g., application, OS, etc.) or hardware (e.g., network card, data storage device, etc.). In some examples, the emulated channel adapter may be implemented by one or more DPDK threads executed by a processor core and may utilize a poll mode driver, which may also be configured according to the DPDK kit. When its thread is active, the emulated channel adapter may utilize the poll mode driver to poll one or more queue pairs to determine whether any work requests have been posted to the queue pair and/or poll one or more software switches or other computing components to determine whether any messages should be delivered to a queue pair managed by the emulated channel adapter. The emulated channel adapter may act on work requests discovered by polling. For example, for a work request posted to a send queue, the emulated channel adapter may send payload data from the work request to a destination node associated with the work queue. Also, for example, the emulated channel adapter may deliver incoming messages to an appropriate receive queue. The incoming messages may be received, for example, from a software switch, network interface controller, or another poll mode driver servicing another channel.

FIG. 1 is a diagram showing one example of a host computing device 10 for implementing memory-mapped I/O channels. The host computing device 10 executes an application 2. In some examples, the host computing device 10 may execute the application 2 directly. In some examples, the application 2 may be executed at a virtual machine hosted by the host computing device 10 (see FIG. 2). The application 2 may be assigned a virtual address space 4. The virtual address space 4 may comprise physical positions at a memory or other data storage of the host computing device 10 that are assigned to the application 2 for use. In some examples, an operating system (OS) 12 may provide the application 2 and/or an associated driver, such as IB driver 3, with one or a set of virtual memory addresses describing locations 8 at the virtual address space. Virtual memory addresses may correspond to addressable locations 8 in the virtual address space. The OS 12 may be a host OS of the host computing device 10 or, in some examples, may be a guest OS executing at a virtual machine hosted by the host computing device 10.

The application 2 may access the virtual address space 4 utilizing the OS 12 and/or another component, such as the IB driver 3. The IB driver 3 may be associated with the application 2 and/or with the OS 12. The IB driver 3 may be configured to send messages utilizing an IB fabric. For example, the application 2 may request one or more queue pairs 6a, 6n and/or one or more completion queues 7a, 7n. The IB driver 3 may receive the request and allocate memory locations 8 to the requested queues, for example, as indicated in FIG. 1. In some examples, each queue pair 6a, 6n corresponds to a distinct channel between the application 2 and a channel counterparty (not shown). The channel counterparty may be another application or any other computing device hardware or software node executing at the same host computing device 10 as the application 2 or another computing device. The application 2 and/or IB driver 3 may communicate with the channel counterparty as though it were an IB channel endpoint, for example, utilizing queue pairs 6a, 6n. Queue pairs 6a, 6n may comprise a send queue and a receive queue, described in more detail herein. In some examples, each queue pair 6a, 6n is identified by a queue pair number and a port identifier, described in more detail herein. Although two queue pairs 6a, 6n are shown in FIG. 1, an application such as the application 2 may have any suitable number of queue pairs 6a, 6n. The various components described herein may also utilize one or more completion queues 7a, 7n. For example, completion queues 7a, 7n may be utilized to provide communication between the application 2 and/or IB driver 3 and the emulated channel adapter 14a.

The emulated channel adapter 14a may be implemented utilizing a DPDK thread comprising a poll mode driver 15a. For example, the poll mode driver 15a may poll one or more of the queue pairs 6a, 6n to determine when a work request has been written to the queue pair 6a, 6n. In some examples, the poll mode driver 15a may also poll one or more software switches 18, one or more network interface controllers 20, and/or one or more other emulated channel adapters 14b, 14c, 14n to find incoming messages to be delivered to the application 2 from a channel counterparty. The emulated channel adapter 14a may deliver outgoing messages from the application 2 to the appropriate channel counterparty and/or deliver incoming messages from a channel counterparty to the appropriate receive queue of the appropriate queue pair 6a, 6n, where it may be retrieved from the application 2 by the IB driver 3.

In some examples, the emulated channel adapter 14a may be implemented as a thread (e.g., a DPDK thread) bound to a processor core 16. In some examples, the processor core 16 may be capable of multithreading and may also execute additional emulated channel adapters 14a, 14b, 14n. The additional emulated channel adapters 14a, 14b, 14c, 14n may implement memory-mapped I/O channels for the application 2 and/or for other computing device components at the host computing device. The additional emulated channel adapters 14b, 14c, 14n may also utilize poll mode drivers as described herein (additional poll mode drivers not shown in FIG. 1). In some examples, the processor core 16 may be dedicated to executing emulated channel adapters 14a, 14b, 14c, 14n and may not execute threads from any other components at the computing device 10. In other examples, the processor core 16 may also execute threads from other computing device 10 components (e.g., the application 2, the OS 12, etc.)

To send a message to a channel counterparty, using the memory-mapped I/O channel of FIG. 1, the application 2 may request that the IB driver 3 send a message to the channel counter party. The IB driver 3 (e.g., through the OS 12) may write a work request 24 to the send queue of the queue pair 6a corresponding to the channel counterparty that is to receive the message. When the emulated channel adapter 14a polls the queue pair 6a (e.g., utilizing the poll mode driver 15a), it may detect the work request 24 and retrieve payload data 28. The emulated channel adapter 14a may perform various formatting of the payload data 28 to generate a formatted message 32. For example, if the message is to be transmitted utilizing a packet-switched network, the emulated channel adapter 14a may form one or more packets including the payload data 28, for example, by adding various addressing frames to the packets, etc.

The formatted message 32 may be provided to a software switch 18, a network interface controller 20, and/or to another emulated channel adapter 14b, 14c, 14n servicing another queue pair for the channel counterparty. The software switch 18 may be configured to provide the formatted message to the channel counterparty, for example, when the channel counterparty is another computing device node of the host computing device 10 (e.g., another application). The software switch 18, in some examples, may be implemented according to the Open vSwitch standard. In some examples where the channel counterparty is at another computing device, the emulated channel adapter 14a may provide the formatted message 32 to the network interface controller 20, which may be in communication with any form of wired or wireless network to send the formatted message to the recipient node. Although only one software switch 18 and network interface controller 20 are shown in FIG. 1, various examples may include multiple instances of software switches 18 and/or network interface controllers 20 at the computing device 10. In some examples when the emulated channel adapter 14a is implemented using the DPDK kit, the network interface controller 20 may be configured to be used with the DPDK and/or be associated with a driver for utilizing the network interface controller 20 with the DPDK kit. In some examples, the emulated channel adapter 14a may provide the formatted message 32 to another emulated channel adapter 14b, 14c, 14n, which may then deliver the message to a receive queue of the queue pair of another application serviced by that emulated channel adapter 14b, 14c, 14n.

The channel counterparty may, but need not, be configured to communicate utilizing IB fabric. For example, in when a software switch 18 and/or network interface controller 20 is used to reach the channel counterparty, the channel counterparty may communicate with the software switch 18 or network interface controller 20 utilizing any suitable communication protocol. In examples where another emulated channel adapter 14b, 14c, 14n is used to reach the channel counterparty, the channel counterparty may be adapted to utilize the IB fabric. For example, the channel counterparty may be associated with an IB driver similar to the IB driver 3 described herein with respect to the application 2.

In some examples, the emulated channel adapter 14a also polls to determine if there are any incoming messages directed to the application 2. For example, the emulated channel adapter 14a may poll one or more software switches 18, one or more network interface controllers 20, one or more other emulated channel adapters 14b, 14c, 14n, etc. When an incoming message is detected, the emulated channel adapter 14a may receive a formatted incoming message 30 from the appropriate software switch 18, network interface controller 20, and/or another emulated channel adapter 14b, 14c, 14n. The emulated channel adapter 14a may extract payload data 26 representing the message from the formatted incoming message 30 and write the payload data 26 to the receive queue of the queue pair 6a corresponding to the node that send the message. In some examples, the emulated channel adapter 14a may format incoming payload data 26 according to IB syntax. The IB driver 3 may read the incoming payload data 26 from the receive queue of the queue pair 6a and provide an incoming message 22 to the application 2.

Figure 2:
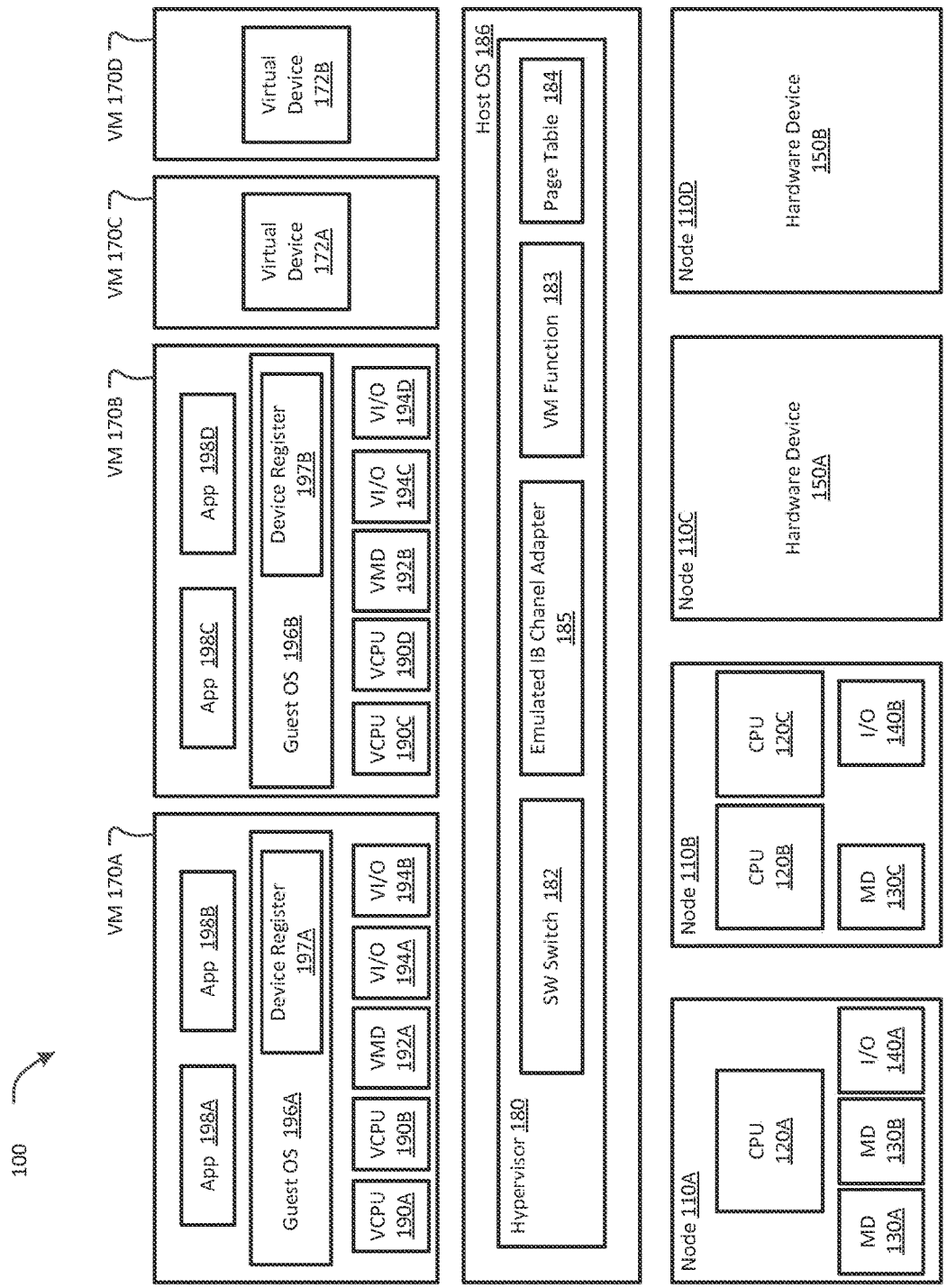
FIG. 2 is high-level component diagram showing another example of a host computing device executing a plurality of virtual machines (VMs).

Various examples of memory-mapped I/O channels may be implemented in a host computing device executing one or more virtual machines. For example, FIG. 2 is high-level component diagram showing another example of a host computing device 100 executing virtual machines (VMs) 170A, 170B, 170C, 170D. The computing device 100 may include one or more interconnected hardware nodes 110A-D. Each hardware node 110A-B may in turn include one or more physical processors (e.g., CPU 120A-C) communicatively coupled to memory devices (e.g., MD 130A-C) and input/output devices (e.g., I/O 140A-B). Each hardware node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In some examples, a processor may follow the Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

A memory device 130A-C may include a volatile or non-volatile memory device, such as RAM, ROM, EEPROM, or any other device capable of storing data. I/O devices 140A-B may include one or more devices capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each hardware node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-C, I/O 140A-B, a software device, and/or hardware device 150A-B.

As noted above, the host computing device 100 may run multiple virtual machines (e.g., VM 170A-D), by executing a software layer (e.g., hypervisor 180) above the hardware and below the virtual machines 170A-D, as schematically shown in FIG. 1. In some examples, the hypervisor 180 may be a component of the host operating system 186 executed by the computer system 100. In other examples, the hypervisor 180 may be provided by an application running on the host operating system 186, or may run directly on the host computing device 100 without an operating system beneath it. The hypervisor 180 may virtualize the physical layer, including processors, memory, and I/O devices, and present this virtualization to virtual machines 170A-D as devices, including virtual processors (e.g., VCPU 190A-D), virtual memory devices (e.g., VMD 192A-B), and/or virtual I/O devices (e.g., VI/O 194A-D).

In some examples, a virtual machine 170A-B may execute a guest operating system 196A-B which may utilize the underlying VCPU 190A-D, VMD 192A-B, and VI/O devices 194A-D. One or more applications 198A-D may be running on a virtual machine 170A-B under the guest operating system 196A-B. The virtual machine 170A-B may include a device register 197A-B. As used herein, a device register 197A-B refers to a configuration space of a device. In an example embodiment, a device may be a device (e.g., VCPU 190A-D, VMD 192A-B, VI/O devices 194A-D, virtual device 172A-B, etc.) of a guest operating system 196A-B (that is, a "guest device"). In an example embodiment, the device register 197A-B is a guest device register. In an example embodiment, a device register 197A-B may be a command register or a base address register (BAR). In an example embodiment, a device register 197A-B may include any known register used in the peripheral component interconnect (PCI) configuration space. In same examples, a base address register (BAR) includes a base (or start) address of the guest device at which a physical memory region of the host device (which corresponds to the guest device) can be accessed and further includes a size indicator which denotes the size of the memory region of the host device. In some examples, guest OSs 196A, 196B may assign applications 198A-D virtual address space from the physical memory region of the host device indicated by the device register 197A, 197B. Applications 198A-D may reference their respective virtual address space with virtual memory addresses provided by the Guest OSs 196A-B. Also, in some examples, guest OSs 196A-B and/or guest applications 198A-D may be associated with one or more IB drivers (not shown in FIG. 2) similar to the IB driver 3 described with respect to FIG. 1.

In some examples, a virtual machine 170A-B may include multiple virtual processors (VCPU) 190A-D. Processor virtualization may be implemented by the hypervisor 180 scheduling time slots on one or more physical processors 120A-C such that from the guest operating system's perspective those time slots are scheduled on a virtual processor 190A-D. In some examples, a virtual machine 170C-D may include virtual devices 172A-B. A virtual device 172A-B may provide the functionality of traditional hardware devices such as network devices, PCI devices, storage devices, sound or video adaptors, photo/video cameras, printer devices, keyboards, displays, etc.

In an example embodiment, the hypervisor 180 may provide one or more virtual machine functions (VM Functions) 183 to a virtual machine 170A-D. The code that a VM Function 183 runs on the physical processor(s) 120A-C may utilize the resources of host operating system (Host OS) 186, such as the memory devices 130A-C, and the input/output devices 140A-B as well as the resources of one or more of the virtual machines 170A-D including the virtual processors 190A-D, the virtual memory 192A-B, and the virtual I/O devices 194A-D. For example, the VM Function 183 may be called by a VM 170A to transfer data to, or access the resources of the Host OS 186 or another VM 170B. By contrast, each VM 170A may be limited to the use of its own resources including its VCPUs 190A-B, virtual memory 192A, and virtual I/O devices 194A-B unless it invokes a VM Function 183 as described below.

In an example embodiment, the VM Function 183 may be invoked for a VM 170A, by the guest OS 196A that is running on the VM 170A. In an example embodiment, a VM Function 183 may only be invoked if hypervisor 180 provides access or grants a request. For example, a VM 170A or guest OS 196A may invoke a VM Function 183 to handle a task more efficiently or using greater resources than are presently available to the VM 170A or guest OS 196A. In an example embodiment, a hypervisor 180 may grant a VM 170A or guest OS 196A access to a VM Function 183 to allow the VM 170A or guest OS 196A to access a resource without requiring an exit to the hypervisor. In an example embodiment, the hypervisor 180 may also deny the request by causing an undefined opcode exception or a general protection fault exception whenever the VM Function 183 is invoked.

In some examples, one or more emulated channel adapter 185 may also execute at the hypervisor 180, similar to the VM function 183. In some examples, each emulated channel adapter 185 may be implemented by a thread (e.g., a DPDK thread) executed by a processor core of one or more of the host CPUs 120A-C. In some examples, one or more processor cores of the CPUs 120A-C may be dedicated to executing emulated channel adapters 185. For example, one or more processor cores may be configured for multithreading and may, thereby, execute multiple emulated channel adapters 185 concurrently. As the thread implementing each emulated channel adapter 185 becomes active, it may poll for outgoing or incoming messages, as described herein. Emulated channel adapters 185, in some examples, may poll utilizing poll mode drivers, similar to the poll mode driver 15a described herein. In some examples, the hypervisor 180 may also execute one or more software switches 182, similar to the software switch 18 described above, although in other examples, the software switch 182 may be executed at the VM 170A-C level.

In some examples, the hypervisor 180 may also keep and/or maintain a page table 184. For example, the hypervisor 180 may manage the memory usage of the VMs 170A-D. The page table 184 may be a data structure used by the hypervisor 180 to store a mapping of addresses of the guest OS 196A-B to addresses of the host OS 186 (e.g., physical resources of the computer system 100). Accordingly, address translation may be handled using page tables 184. For example, the guest OS 196A-B operating within the VMs 170A-D may be given the impression that there is a contiguous section of guest memory available, when in reality, the available guest memory may be spread across various memory devices 130A-C. Memory addresses at the page table 184, in some examples, are divided into pages which are identified with a unique number (e.g., Page Frame Number (PFN)), although other delineations are also contemplated. Page tables 184 may be used together with any paging data structure used by the VMs 170A-D to support translation from guest OS 196A-B to host OS 186 addresses (e.g., 32-bit linear address space using a two-level hierarchical paging structure, Physical Address Extension mode, INTEL Extended Memory 402 Technology mode, etc.).

Figure 3:
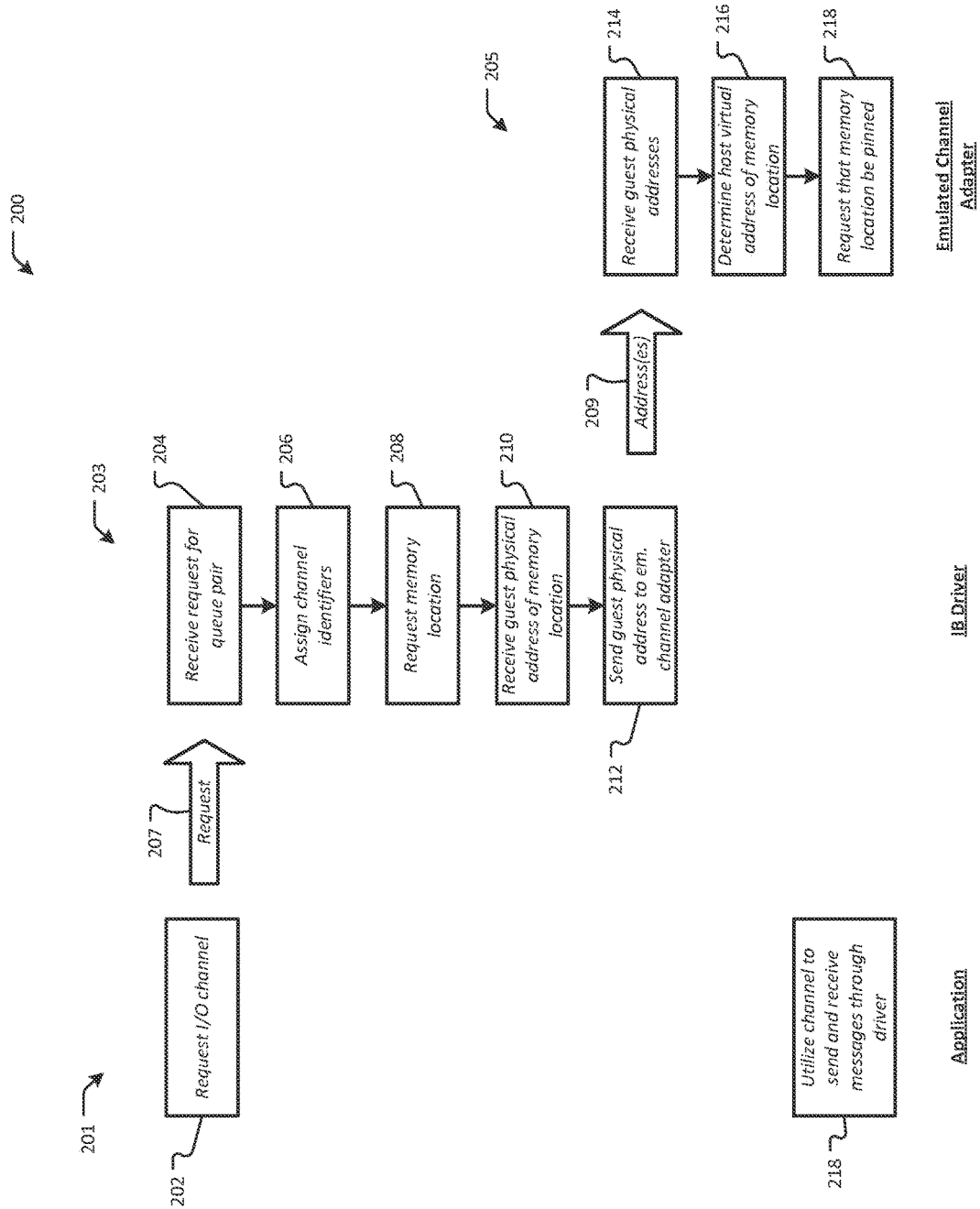
FIG. 3 is a flow chart showing one example of a process flow that may be executed by an application and a poll mode driver to create a memory-mapped I/O channel.

FIG. 3 is a flow chart showing one example of a process flow 200 that may be executed by an application and an emulated channel adapter to create a memory-mapped I/O channel. The process flow 200 includes three columns. A column 201 includes actions that may be performed by an application, such as application 2 or applications 198A-D. Column 203 includes actions that may be performed by an IB driver, such as the IB driver 3. Column 205 includes actions that may be performed by an emulated channel adapter, such as emulated channel adapter 14a-c or emulated channel adapter 185.

At 202, the application may request a memory-mapped I/O channel. In some examples, the request may be a request for an I/O channel (e.g., an IB I/O channel) and/or a request for a new queue pair. The request 207 may include, for example, data describing a computing device node that is to be the channel counterparty of the new channel. The channel counterparty may be, for example, another application executing on the same host computing device as the requesting application, another application executing on a different computing device, a hardware component (such as a memory device) at the host computing device, a hardware component at a different computing device, etc. The request 207 may be provided to the IB driver.

The IB driver may receive the request 207 at 204. The IB driver may receive the request directly and/or via a guest or other OS associated with the application. At 206, the IB driver may assign channel identifiers to the request 207. For example, the channel may be described by a queue pair number and a port identifier. The queue pair number may be selected in any suitable manner. For example, the IB driver may assign consecutive integers to queue pairs requested by the same application. In some examples, the port identifier may include a local identifier (LID) and a global identifier (GID). The LID may be a 16-bit value, assigned when the corresponding port becomes active. The GID may be a 128-bit value formed by concatenating a 64-bit IB sub net prefix and a 64-bit GUID (Global Unique Identifier). In a true IB architecture implementation (e.g., utilizing an IB channel adapter rather than an emulated channel adapter), the GID and LID may be assigned by a subnet manager, which is a component performing configuration and control of the subnet. Because the IB architecture beyond the IB driver is emulated, however, there may not be a subnet manager. Accordingly, in some examples, the emulated channel adapter may be in communication with the IB driver to generate the GUID, GID and LID, which may be provided back to the IB driver.

At 208, the IB driver may request a memory location at the virtual address space associated with the application. The requested memory location or locations may store a queue pair for the channel. In some examples, the requested memory location or locations may also store one or more completion queues with functionality as described herein. The IB driver may direct its request for a memory location to an OS, such as the host computing device OS 12 or a guest OS 196A-B. In response, the OS may provide the IB driver with a address (or set of addresses) of the requested memory location or locations, which the IB driver may receive at 210. When the application is a virtual application 198A-D, the addresses received at 210 may be guest physical addresses at one of the virtual memory devices 192A-B. Also, in some examples, the IB driver may request the memory location after receiving a separate memory location request from the. For example, the application may request the I/O channel at 202 and then, subsequently, request the memory location for the queue pair separately. When the application makes a separate request for the memory location, the IB driver may obtain the memory locations, as described, in response to the request from the application.

At 212, the IB driver may provide the address or addresses 209 storing the queue pair and/or completion queue(s) for the channel to the emulated channel adapter. The emulated channel adapter may receive the addresses 209 in any suitable manner. In some examples, a thread implementing the emulated channel adapter may have been previously instantiated and the IB driver may be configured to direct the addresses 209 directly to the emulated channel adapter. In other examples, the addresses 209 may be initially directed from the application to an OS, such as the OS 12 of the host computing device 10 and/or a guest OS 196A-B. The OS may instantiate a thread for implementing the emulated channel adapter and then forward the addresses 209 to the emulated channel adapter. In some examples, the OS may also bind the thread to a particular processor core such as, for example, a processor core dedicated to execute threads for implementing memory-mapped I/O channels.

The emulated channel adapter may receive the addresses 209 at 214. At 216, the emulated channel adapter may determine a physical address (or set of addresses) corresponding to the virtual addresses 209 received at 208. A physical address may indicate a physical position at the host device memory. For example, a physical address at the host computing device 100 may refer to a position at one or more of the memory devices 130A-C. For example, when the application is a virtual application 198A-D, the emulated channel adapter 185 may access the hypervisor 180 and/or an OS executing below the hypervisor 180 to determine the physical address. Optionally (for example, when the application is a virtual application executing at a virtual machine), the emulated channel adapter may request, at 218 that the memory location be pinned to random access memory or other quickly accessible memory of the host computing device. For example, if the memory location or locations including a queue pair, completion queue, or other IB data structure were to be written to a data storage device having longer access times, such as a hard disk drive, it would increase the time necessary to service a channel message. In various examples, when the memory location is assigned to the IB driver at 210, the OS may pin the memory location to the host computing device's random access memory. When the application is a virtual application 198A-D, however, the OS communicating with the IB driver may be a guest OS 196A-B that does not have access to the actual physical memory 130A-C of the host computing device. Accordingly, the emulated channel adapter may request that the hypervisor 180 and/or host OS 186 pin the memory location to physical memory 130A-C of the host computing device. In this way, the queue pair and/or completion queue may remain at physical random access memory or other quickly-accessible memory of the host computing system.

The division of actions between the application, IB driver, and emulated channel adapter shown in FIG. 3 is but one example of how the actions may be divided among the various components. For example, in some implementations, the initial request for the I/O channel may be directed to an OS, such as the OS 12 or the guest OSs 196A-B. The OS may utilize an IB driver and/or may directly perform the actions of the IB driver described above. The OS may also instantiate a thread for executing the poll mode driver and/or perform any other actions executed by the poll mode driver in the process flow 200.

Figure 4:
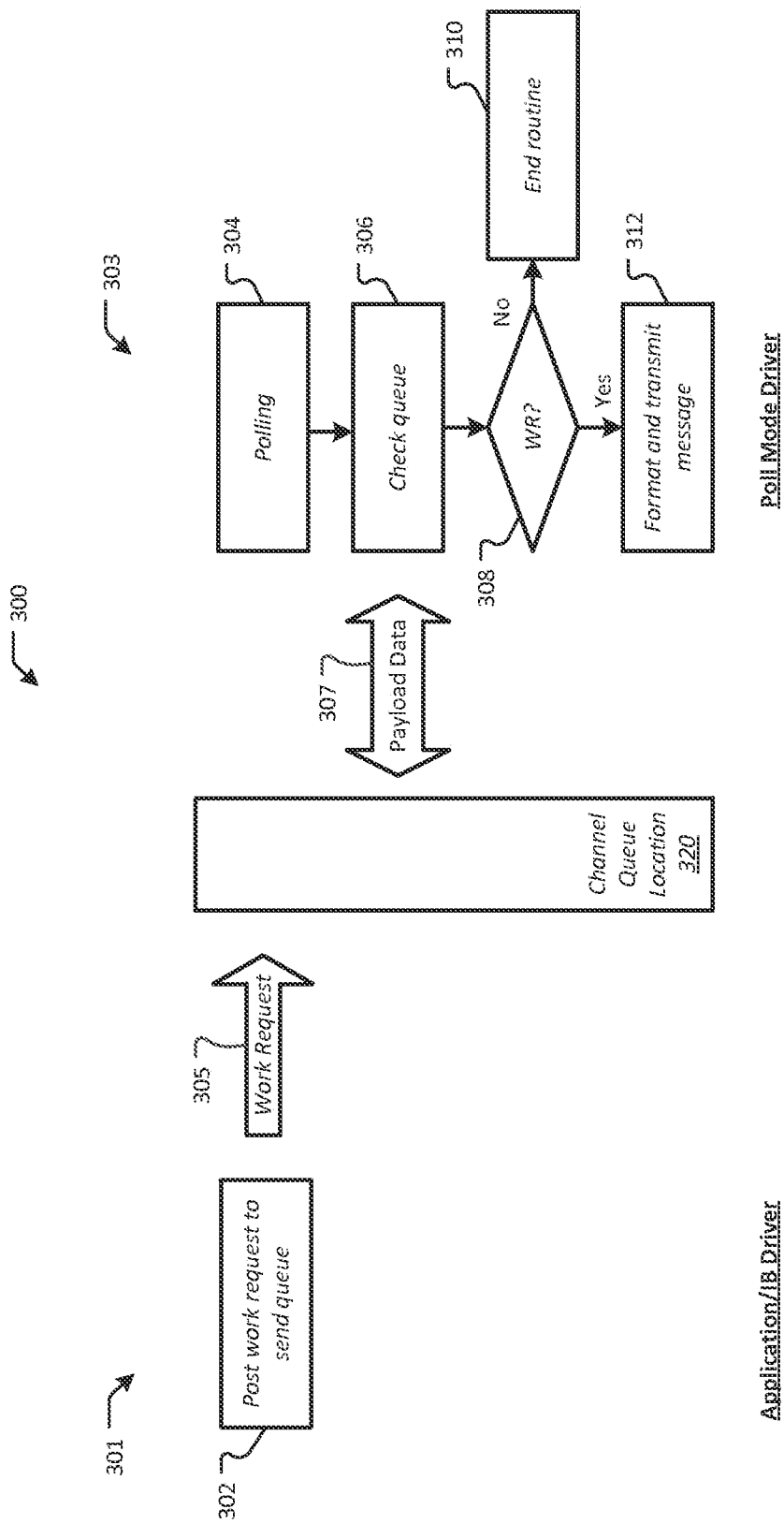
FIG. 4 is a flow chart showing one example of a process flow to send a message to a channel counterparty utilizing a memory-mapped I/O channel.

FIG. 4 is a flow chart showing one example of a process flow 300 that may be executed by an application, IB driver and/or a poll mode driver to send a message to a channel counterparty utilizing a memory-mapped I/O channel. Like the process flow 200, the process flow 300 also includes two columns 301 and 303. Column 301 includes actions that may be performed by the application and/or by the IB driver, while column 303 includes actions that may be performed by the emulated channel adapter. The process flow 300 also illustrates a channel queue location 320. The channel queue location 320 may be a location in the physical memory of the host computing device where the queue pair for the memory-mapped I/O channel is stored. In some examples, the channel queue location 320 may also include a completion queue, as described herein. In some examples, the emulated channel adapter may access the location 320 utilizing the physical memory address or addresses referenced at the process flow 200.

At 302, the application may request that a message be sent to the channel counterparty. For example, the application 302 may send a message request to the IB driver. The IB driver may, in response, post a work request 305 to the send queue of the queue pair at the location 320. The work request may comprise a description of a message to be sent to the channel endpoint node. For example, the work request may include payload data describing the message itself. In some examples, the work request may also include data describing the I/O channel including, for example, the queue pair number, the GID, LID, GUID, etc. of the channel.

At 304, the emulated channel adapter may poll for messages on one or more channels managed by the emulated channel adapter. For example, the emulated channel adapter may poll for outgoing messages by polling channel queue locations corresponding to channels managed by the emulated channel adapter. The emulated channel adapter may poll for incoming messages by polling a software switch, network interface controller, other emulated channel adapter, and/or other component that may comprise incoming messages directed to one or more channel queue pairs managed by the emulated channel adapter. In some examples, the emulated channel adapter may be implemented by a thread executed at a processor core, such as the processor core 16, which may execute multiple threads concurrently. For example, a dedicated processor core may concurrently execute threads for implementing multiple emulated channel adapters. Different emulated channel adapters may implement memory-mapped I/O channels for different applications and/or additional channels for the application described at 302. Also, in some examples, the processor core executing the thread that implements the emulated channel adapter may execute other threads implementing various other software components at the host computing device. When the processor core executes multithreading, not all of the threads executing at the processor core may be active at all times. Instead, one thread may activate and remain active until it is interrupted or it has completed its task. Then the first thread may be deactivated and a new thread may be executed. The emulated channel adapter may poll, as described, when the thread implementing the emulated channel adapter is active.

At 306, the emulated channel adapter may poll the queue pair at the channel queue location 320 to determine if any new work requests, such as work request 305, have been posted. For example, polling the channel queue location 320 may be part of the polling 304. In some examples where the emulated channel adapter is responsible only for the channel corresponding to the channel queue location 320, action 304 may be omitted. In some examples, the emulated channel adapter may poll the channel queue location 320 directly utilizing the physical address for the location 320 determined, for example, as described above at 212. In some examples, the emulated channel adapter may execute a routine that polls multiple potential sources of messages under the responsibility of the emulated channel adapter. For example, the emulated channel adapter may poll one or more queue pairs for outgoing messages from applications and/or may poll one or more network interface controllers, software switches, other emulated channel adapters, etc. for incoming messages to applications. Polling the queue pair at 306 may return the work request 305 written to the queue pair by the application at 302. The emulated channel adapter may receive from the location 320 payload data for the requested message 307. In some examples, the emulated channel adapter may also clear the work request from the location 320.

At 308, the emulated channel adapter may determine whether the polling at 306 indicated a work request at the location 320. If not, then the emulated channel adapter may end its routine at 310 and cede the processor core to the next thread. (Alternatively, the emulated channel adapter may check another queue pair or other message source before ending its routine). If a work request (e.g., the work request 305) is present at the location 320, then the emulated channel adapter may format the payload data 307 and transmit it to the channel counterparty at 312. When the channel counterparty is another application executing at the same host computing device (e.g., another application 198A-D), the formatted payload data may be provided to a software switch and/or another emulated channel adapter. When the channel endpoint node is at another computing device, the formatted payload data may be provided to a network interface controller for transmission to the other computing device.

Figure 5:
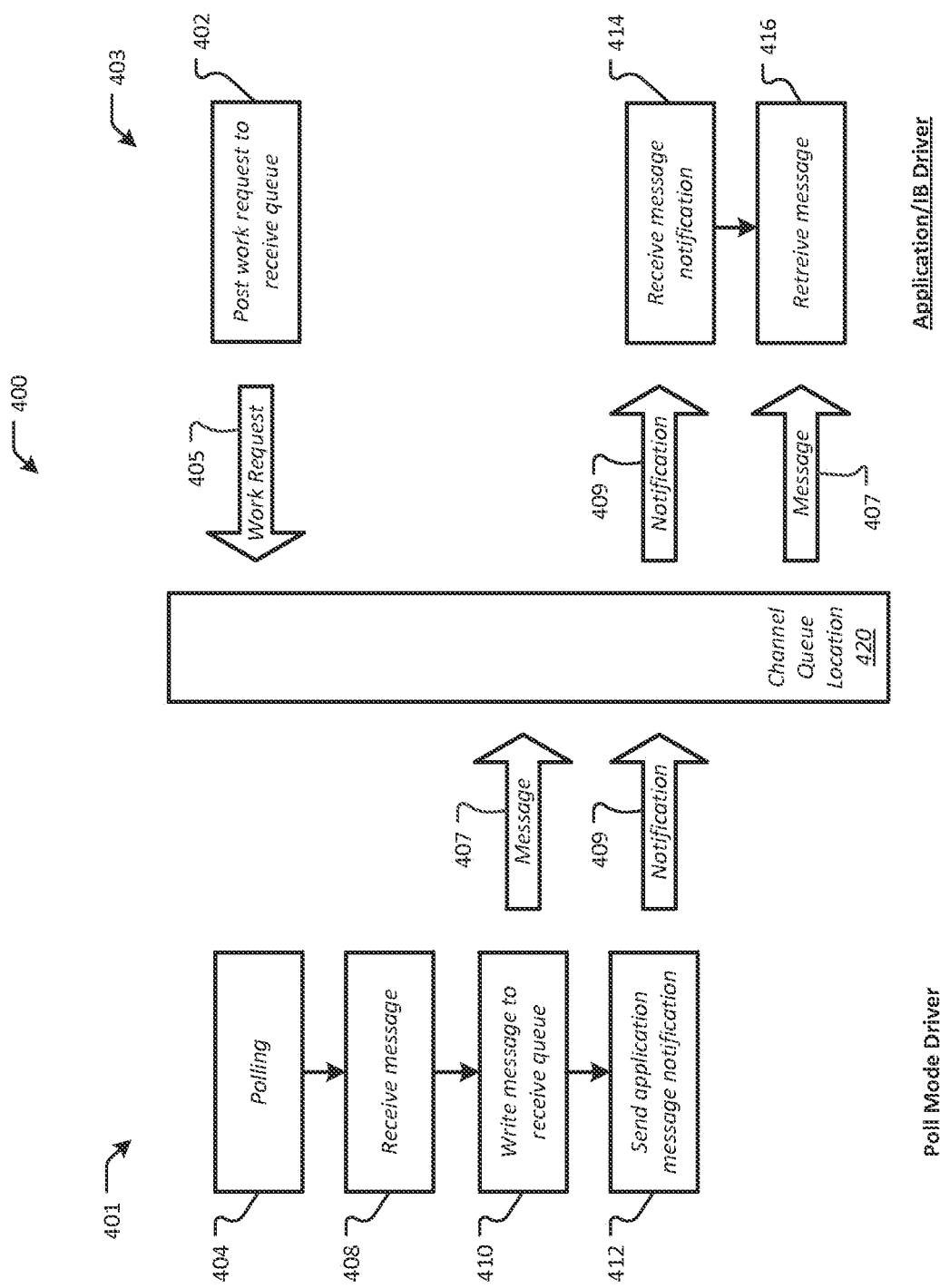
FIG. 5 is a flow chart showing one example of a process flow that may be executed by an application and a poll mode driver to deliver a message sent by a channel endpoint node to the application.

FIG. 5 is a flow chart showing one example of a process flow 400 that may be executed by an application and/or IB driver along with and a emulated channel adapter to deliver a message sent by a channel counterparty node to the application. The process flow 400 also includes two columns 401, 403. Column 401 includes actions performed by the emulated channel adapter, while column 403 includes actions performed by the application and/or IB driver. The process flow 400 also illustrates a channel queue location 420, which may be similar to the channel queue location 320 described above.

At 402, the IB driver may write a work request 405 to the receive queue of the queue pair at the location 420. The work request 405 may serve as an entry to which the emulated channel adapter may later write a received message. The IB driver may write the work request 405 to the receive queue on its own and/or in response to an indication from the application that an incoming message is expected. In some examples, the IB driver may send more than one work request 405 to the receive queue. For example, the IB driver may send one work queue for each anticipated received packet of data from a message or messages. At 404, the emulated channel adapter may poll for messages on one or more channels managed by the emulated channel adapter, for example, as described at 304 above. The emulated channel adapter may poll one or more software switches, one or more network interface controllers, and/or one or more other emulated channel adapters for messages directed to the application via the channel. When a message directed to the application via the channel is found, it may be received at 408. If no message is found, the emulated channel adapter may service its next channel and/or cede control of the processor core to another thread.

At 410, the emulated channel adapter may write the received message 407 to the receive queue at the location 420. For example, the emulated channel adapter may write the received message 407 to one or more of the work requests 405 written to the receive queue at 402. In some examples, prior to writing the message 407 to the location 420, the emulated channel adapter may remove formatting from its source. For example, when the message is received from a network interface controller, the emulated channel adapter may be programmed to receive a plurality of packets including the message, remove address, checksum and other syntax frames from the packets, reassemble the message, and then post the message to the location 420.

The emulated channel adapter, at 412, may send a notification 409 to the application and/or IB driver indicating that a message 407 has been written to the receive queue. For example, the notification 409 may be written to a completion queue associated with the channel. The IB driver and/or application may receive the notification 409 from the completion queue at 414. For example, the IB driver may retrieve the notification 409 from the completion queue and forward the notification 409, or other data indicating the presence of the message 407 at the receive queue, to the application. The application may receive the message notification at 414 and retrieve the message 407 from the receive queue (location 420) at 416. For example, upon receiving the notification 409, the IB driver may request the message 407 from the receive queue and provide the message 407 to the application. In some examples, the IB driver may request the message 407 at logical address of the receive queue received from the operating system (e.g., OS 12 and/or guest OS 196A-B). In some examples, the notification 409 is not provided to the application. For example, the IB driver may request the message 407 from the receive queue upon receiving the notification without passing the notification to the application.

Reference in the specification to, "examples," "various examples," "some examples," etc. means that a particular feature, structure, or characteristic described in connection with the example embodiments is included in at least one embodiment of the invention. The appearances of the above-referenced phrases in various places in the specification are not necessarily all referring to the same embodiment. Reference to embodiments is intended to disclose examples, rather than limit the claimed invention. While the invention has been particularly shown and described with reference to several embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

In some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. Such examples are intended primarily for purposes of illustration. No particular aspect or aspects of the example method, product, computer-readable media, and/or system examples described herein are intended to limit the scope of the present disclosure.

The various components described herein may be and/or are executed by any suitable type of computing device including, for example, desktop computers, laptop computers, mobile phones, palmtop computers, personal data assistants (PDAs), etc. As used herein, a "computer," "computer system," "computing device," or "computing device," "machine," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing, and/or communicating data. Such memory can be internal, external, remote, or local with respect to its operatively associated computer or computer system. Memory may also include any means for storing software or other instructions including, for example and without limitation, a hard disk, an optical disk, floppy disk, ROM (read-only memory), RAM (random-access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of a method. It should be noted that the process steps and instructions of the present disclosure can be embodied in software, firmware, or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random-access memories (RAMs), electrically-programmable read-only memories (EPROMs), electrically erasable programmable read-only memories (EEPROMs), magnetic or optical cards, application-specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. A variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

What is claimed is:

1. A method for sending a message, comprising:
   sending, by a first application of a first virtual machine executing at a host computing device and to a message driver, a request for a first queue pair, wherein the request comprises an indication of a channel counterparty, wherein the first queue pair comprises a send queue for sending messages to the channel counterparty and a receive queue for receiving messages from the channel counterparty;
   receiving, by the message driver, the request for the first queue pair;
   requesting, by the message driver and from a guest operating system (OS) of the first virtual machine, a first memory location;
   receiving, by the message driver, a first virtual machine physical address of the first memory location;
   sending, by the message driver and to an emulated channel adapter, the first virtual machine physical address of the first memory location;
   determining, by the emulated channel adapter, a host computing device physical memory address for the first memory location, wherein the emulated channel adapter comprises a thread executed at and bound to a first processor core of the host computing device; and
   periodically polling, by the emulated channel adapter, the first memory location for at least one work request written to the first queue pair.

2. The method of claim 1, further comprising:
   receiving, by the message driver and from the first application, a request to send payload data to the channel counterparty; and
   posting, by the message driver, a work request to the send queue of the first queue pair, wherein the work request comprises the payload data.

3. The method of claim 2, further comprising:
   determining, by the emulated channel adapter, that the work request has been written to the first memory location; and
   sending the payload data to the channel counterparty.

4. The method of claim 2, wherein the channel counterparty is a second application of a second virtual machine executing at the host computing device, further comprising sending the payload data and addressing data describing the channel counterparty to a software switch executing at the host computing device.

5. The method of claim 2, wherein the channel counterparty is at a second computing device, further comprising:
   generating a plurality of packets, wherein the plurality of packets comprises the message and an indication of the channel counterparty; and
   sending the plurality of packets to a network interface controller of the host computing device.

6. The method of claim 2, further comprising sending the work request, by the message driver, to the first virtual machine physical address for the first memory location.

7. The method of claim 1, further comprising:
   sending, by the first application and to the message driver, a request for a second queue pair for a second communication channel between the first application and a second channel counterparty;
   receiving, by the message driver, the request for the second queue pair;
   requesting, by the message driver and from the guest OS, a second memory location;
   receiving, by the message driver, a second virtual machine physical address for the second memory location;
   sending, by the message driver and to the emulated channel adapter, the second virtual machine physical address of the second memory location;
   determining, by the emulated channel adapter, a host computing device physical memory address for the second memory location; and
   periodically polling, by the emulated channel adapter, the second memory location.

8. The method of claim 1, further comprising:
   receiving, by the emulated channel adapter, incoming payload data, the incoming payload data from an incoming message directed to the first application;
   writing, by the emulated channel adapter, the incoming payload data to the receive queue; and
   sending, by the emulated channel adapter, a notification of the incoming message to the first application.

9. The method of claim 8, further comprising, receiving, by the emulated channel adapter and from a software switch executing at the host computing device, the incoming payload data.

10. The method of claim 8, further comprising, receiving, by the emulated channel adapter and from a network interface controller of the host computing device, the incoming payload data.

11. The method of claim 8, further comprising polling, by the emulated channel adapter, at least one of a network interface controller or a software switch for incoming messages.

12. A host computing device, comprising:
a plurality of processor cores; and
a memory device comprising instructions stored thereon that, when executed by one or more of the plurality of processor cores, causes the host computing device to:
execute a message driver programmed to:
receive, from a first application, a request to establish an input/output (I/O) channel;
request, from an operating system, a first memory location in a virtual address space of the first application for a send queue for the I/O channel;
receive, from the operating system, the first memory location, the first memory location having a physical memory location;
signal, to an emulated channel adapter, the establishment of the I/O channel with the send queue at the physical memory location; and
signal, to the first application, that the I/O channel was established with the send queue at the first memory location; and
execute the emulated channel adapter programmed to:
receive a signal indicating the physical memory location of the send queue;
request, from the operating system, that a virtual memory address corresponding to the physical memory location be pinned;
poll the physical memory location at the memory device;
determine that a work request is present at the send queue, the work request corresponding to a message having a payload data, the message being from the first application to send across the I/O channel; and
send the payload data to a channel counterparty associated with the I/O channel.

13. The host computing device of claim 12, wherein the channel counterparty is a second application executed at the host computing device, and wherein the emulated channel adapter is further programmed to send the payload data and addressing data describing the channel counterparty to a software switch executing on the host computing device.

14. The host computing device of claim 12, wherein the channel counterparty is at a second computing device, wherein the emulated channel adapter is further programmed to:
generate a plurality of packets, wherein the plurality of packets comprises the payload data and addressing data describing the channel counterparty; and
send the plurality of packets to a network interface controller of the host computing device.

15. The host computing device of claim 12, wherein the request to establish the I/O channel comprises data describing the channel counterparty.

16. The host computing device of claim 12, wherein the emulated channel adapter is further programmed to send to the operating system a request to pin the first memory location to a non-volatile portion of the memory device.

17. The host computing device of claim 12, wherein the operating system is a guest operating system of a virtual machine executed at the host computing device.

18. The host computing device of claim 12, wherein the memory device further comprises instructions stored thereon that, when executed by one or more of the plurality of processor cores, causes the host computing device to:
instantiate an emulated channel adapter thread for implementing the emulated channel adapter; and
bind the emulated channel adapter thread to a first processor core of the plurality of processor cores.

19. The host computing device of claim 18, wherein the memory device further comprises instructions stored thereon that, when executed by one or more of the plurality of processor cores, causes the host computing device to:
instantiate a second emulated channel adapter thread for implementing a second emulated channel adapter; and
bind the second emulated channel adapter to the first processor core of the plurality of processor cores.

20. A host computing device, comprising:
a plurality of processor cores; and
a memory device comprising instructions stored thereon that, when executed by one or more of the plurality of processor cores, causes the host computing device to:
execute a message driver programmed to:
receive, from a first application, a request to establish an input/output (I/O) channel;
request, from an operating system, a first memory location in a virtual address space of the first application for a send queue for the I/O channel;
receive, from the operating system, the first memory location;
signal, to an emulated channel adapter, the establishment of the I/O channel with the send queue at the first memory location; and
signal, to the first application, that the I/O channel was established with the send queue at the first memory location; and
execute the emulated channel adapter programmed to:
receive a signal indicating the first memory location of the send queue;
request, from the operating system, that a virtual memory address corresponding to the physical memory location be pinned to a physical address;
poll the physical address of the memory device;
determine that a work request is present at the send queue, the work request corresponding to a message having a payload data, the message being from the first application to send across the I/O channel; and
send the payload data to a channel counterparty associated with the I/O channel.

* * * * *